United States Patent
Paredes (10) Patent No.: US 10,412,662 B2
(45) Date of Patent: Sep. 10, 2019

(54) NORMALIZED ACCESS BARRING

(71) Applicant: Telefonaktiebolaget LM Ericsson (publ), Stockholm (SE)

(72) Inventor: Ricardo Paredes, Ottawa (CA)

(73) Assignee: Telefonaktiebolget LM Ericsson (Publ), Stockholm (SE)

( * ) Notice: Subject to any disclaimer, the term of this patent is extended or adjusted under 35 U.S.C. 154(b) by 138 days.

(21) Appl. No.: 15/303,975

(22) PCT Filed: Apr. 24, 2014

(86) PCT No.: PCT/IB2014/060990
§ 371 (c)(1),
(2) Date: Oct. 13, 2016

(87) PCT Pub. No.: WO2016/162460
PCT Pub. Date: Oct. 29, 2015

(65) Prior Publication Data
US 2017/0041855 A1    Feb. 9, 2017

(51) Int. Cl.
*H04W 48/06*    (2009.01)
*H04W 88/08*    (2009.01)
*H04W 28/02*    (2009.01)
*H04W 48/10*    (2009.01)

(52) U.S. Cl.
CPC ....... *H04W 48/06* (2013.01); *H04W 28/0247* (2013.01); *H04W 28/0289* (2013.01); *H04W 48/10* (2013.01); *H04W 88/08* (2013.01)

(58) Field of Classification Search
None
See application file for complete search history.

(56) References Cited

U.S. PATENT DOCUMENTS 6,282,424 B1 * 8/2001 Wright ............... H04M 3/36
                                                370/329
7,099,674 B2 * 8/2006 Diao ................ H04W 24/00
                                                370/229
(Continued)

FOREIGN PATENT DOCUMENTS

WO    2013020582 A1    2/2013

OTHER PUBLICATIONS

Alcatel-Lucent, "Access Control Improvements", 3GPP TSG-RAN WG2#85bis, Valencia, Spain, Mar. 31-Apr. 4, 2014, R2-141586 (Year: 2014).*

(Continued)

*Primary Examiner* — Joseph A Bednash
(74) *Attorney, Agent, or Firm* — Patent Portfolio Builders, PLLC (57) ABSTRACT

A method and apparatus for defining access barring parameters in a communication network is provided. In a communication network that includes a base station in communication with multiple User Equipments, UEs. A number of UEs attempting to access the base station for a first time period is estimated. A barring factor is determined for a second time period based at least in part on the estimated number of UEs attempting to access the base station. The second time period is different than the first time period. A barring time is determined based at least in part on the determined barring factor for the second time period.

21 Claims, 3 Drawing Sheets

(56) References Cited

U.S. PATENT DOCUMENTS

| | | | |
|---|---|---|---|
| 2010/0110887 A1* | 5/2010 | Beaujean | H04L 47/822 370/230 |
| 2013/0044702 A1 | 2/2013 | Jayaraman et al. | |
| 2013/0170343 A1 | 7/2013 | Ye et al. | |
| 2014/0004857 A1* | 1/2014 | Rune | H04W 48/12 455/434 |

OTHER PUBLICATIONS

Huawei, HiSilicon, "Discussion on Access Group based access control enhancements", 3GPP TSG RAN WG2 Meeting #85, Prague, Czech Republic, Feb. 10-14, 2014, R2-140165 (Year: 2014).*

Qualcomm Incorporated, "Enhancements to access control", 3GPP TSG-RAN2#85bis, Mar. 31-Apr. 4, 2014, Valencia, Spain, R2-141730 (Year: 2014).*

International Search Report and Written Opinion dated Jan. 27, 2015 for International Application Serial No. PCT/IB2014/060990, International Filing Date—Apr. 24, 2014 consisting of 11-pages.

3GPP TS 22.011 V111.0 (Dec. 2011) 3rd Generation Partnership Project; Technical Specification Group Services and System Aspects; Service Accessibility (Release 11) Dec. 21, 2011 consisting of 26-pages.

3GPP TR 22.986 V11.0.0 (Sep. 2012) 3rd Generation Partnership Project; Technical Specification Group Services and System Aspects; Study on Service Specific Access Control (Release 11) Sep. 21, 2012 consisting of 8-pages.

3GPP TS 36331 V11.2.0 (Dec. 2012) 3rd Generation Partnership Project; Technical Specification Group Radio Access Network; Evolved Universal Terrestrial Radio Access (E-UTRA); Radio Resource Control (RRC); Protocol Specification (Release 11) Jan. 3, 2013 consisting of 340-pages.

3GPP TS 36331 V12.1.0 (Mar. 2014), 3rd Generation Partnership Project; Technical Specification Group Radio Access Network; Evolved Universal Terrestrial Radio Access (E-UTRA); Radio Resource Control (RRC); Protocol Specification (Release 12) Mar. 19, 2014 consisting of 345-pages.

Office Action issued in application No. 14727238.9; dated Feb. 15, 2019; 04 pages.

* cited by examiner

NORMALIZED ACCESS BARRING

CROSS-REFERENCE TO RELATED APPLICATION

This Application is a Submission Under 35 U.S.C. § 371 for U.S. National Stage Patent Application of International Application No. PCT/IB2014/060990, filed Apr. 24, 2014 entitled "NORMALIZED ACCESS BARRING," the entirety of which is incorporated herein by reference.

FIELD

The present invention relates to access control for a telecommunications network and in particular, to methods and devices for normalizing access barring parameters based on certain criteria of the telecommunications network.

BACKGROUND

Access barring is a known operation in mobile networks whereby devices attempting to gain access to a network are barred from using network resources so that other devices can be allowed access to prevent congestion and to control access to limited network resources.

Currently 3rd Generation Partnership Project (3GPP) defines access control mechanisms to handle congestion conditions in a cell of a telecommunications network. A set of access control parameters are defined by 3GPP as a way to inform the wireless device, i.e., user equipment (UE), of the congestion levels in the cell. The access control parameters pertain to least two types of traffic (signaling and data), and different types of services including multimedia, telephony voice and video, for example.

To manage congestion levels in a cell of a telecommunications network, 3GPP utilizes an access control barring factor and an access control barring time, which are communicated to a UE. The barring factor, also known as the "ac-BarringFactor" is a number between 0.00 and 1.00 that indicates a point of reference that the UE should use when executing the network access procedures. Of note, 3GPP defines several sets of barring factor and barring time combinations for various types of traffic and services, for example multimedia telephony service (MMTel) video signaling, MMTel video data, MMTel voice signaling, MMTel voice data, all other signaling, e.g., access class barring (ACB) signaling, and all other data traffic, e.g., ACB data. There may be a set of barring factor and barring time combinations for each access type for every time period.

In accordance with current 3GPP standards, for each access type, a base station supporting a cell advertises an ac-BarringConfig parameter that includes the ac-BarringFactor, the ac-BarringTime and ac-BarringForSpecialAC in which:

ac-BarringFactor is taken from the set {p00, p05, p10, p15, p20, p25, p30, p40, p50, p60, p70, p75, p80, p85, p90, p95};

ac-BarringTime is taken from the set {s4, s8, s16, s32, s64, s128, s256 and s512}; and ac-BarringForSpecialAC is a 5 bit string.

The network access procedure includes generating, by the UE, a random number. The generated random number is compared against the barring factor, e.g., ac-BarringFactor and, if the random number is less than the barring factor e.g., as the ac-BarringFactor defined in the current TS 36.331 standard, the UE is granted access. If, however, the random number is greater than or equal to the random number, the UE must wait, i.e., is barred from retrying, for at least the specified barring time. Once the barring time has expired, the UE can once again attempt to access the cell of the telecommunication network by performing the network access procedures.

Currently, the network access procedures defined by 3GPP do not define how access control parameters are derived. In other words, the current 3GPP standard only sets out a generalized access control procedure without regard for actual resource usage and availability.

SUMMARY

The present invention advantageously provides a method and system for providing normalized access barring parameters. According to one embodiment, a method of defining access barring parameters in a communication network is provided. The communication network includes a base station in communication with multiple User Equipments, UEs. The method includes estimating a number of UEs attempting to access the base station for a first time period. A barring factor is determined for a second time period based at least in part on the estimated number of UEs attempting to access the base station. The second time period is different than the first time period.

According to one aspect of this embodiment, estimating the number of UEs attempting to access the base station for the time period includes determining a barring factor for the first time period and determining a number of UEs accessing the base station for the first time period.

According to another aspect of this embodiment, estimating the number of UEs attempting to access the base station is determined by $N_i = A_i/(1-f_i)$, whereby $N_i$ is the estimated number of UEs attempting to access the base station in the first time period, i. $A_i$ is the number of UEs accessing the base station in the first time period, and $f_i$ is the barring factor for the first time period.

According to yet another aspect of this embodiment, determining the barring factor for the second time period includes monitoring a resource utilization of the base station for the first time period. Available resources of the base station are estimated for the second time period. A number of UEs to permit access to the base station for the second time period is determined based on the number of UEs accessing the base station in the first time period, the resource utilization of the base station for the first time period, and the available resources for the second time period.

According to still another aspect of this embodiment, the number of UEs to permit access to the base station for the second time period is determined by $A_{i+1} = RA_{i+1}/RUe_{i+1}$, whereby $A_{i+1}$ is the number of UEs to allow access to the base station for the second time period, i+1. $RA_{i+1}$ is the estimated available resources of the base station for the second time period, and $RUe_{i+1}$ is a measure of average resources required for a UE for the second time period.

According to an aspect of this embodiment, the barring factor for the second time period is determined by $f_{i+1} = 1 - (A_{i+1}/(N_i - A_i))$, where $f_{i+1}$ is the barring factor for the second time period, i+1. $A_{i+1}$ is the number of UEs to allow access to the base station for the second time period, i+1. $N_i$ is the number of UEs attempting to access the base station in the first time period. $A_i$ is the number of UEs successfully attempting to access the base station in the first time period, and $(N_i - A_i)$ is the number of UEs unsuccessfully attempting to access the base station in the first time period.

According to another aspect of this embodiment, the method further includes determining a barring time based at least in part on the determined barring factor for the second time period.

According to yet another aspect of this embodiment, the barring time is determined by $BT_{i+1}=BT_{min}+((BT_{max}-BT_{min})*f_{i+1})$, whereby $BT_{i+1}$ is the barring time for the second time period, i+1. $BT_{min}$ is the minimum barring time to allow and is configurable with a minimum value of zero. $BT_{max}$ is the maximum barring time to allow and is configurable with a value equal to or greater than $BT_{min}$, and $f_{i+1}$ is the barring factor for the second time period, i+1.

According to still another aspect of this embodiment, the base station supports multiple services and the method further includes determining barring factors for the second time period for each of the multiple services based at least in part on the estimated number of UEs attempting to access the base station.

According to an aspect of this embodiment, barring times for the second time period are determined for each of the multiple services based at least in part on a corresponding determined barring factor for the second time period.

According to another aspect of this embodiment, the base station supports multiple traffic types and the method further includes determining barring factors for the second time period for each of the multiple traffic types.

According to yet another aspect of this embodiment, barring times for the second time period are determined for each of the multiple traffic types based at least in part on a corresponding determined barring factor for the second time period.

According to another embodiment, a base station that is in communication with multiple User Equipments, UEs, in a communication network is provided. The base station includes a processor configured to estimate a number of UEs attempting to access the base station for a first time period. The processor is further configured to determine a barring factor for a second time period based at least in part on the estimated number of UEs attempting to access the base station. The second time period is different than the first time period.

According to an aspect of this embodiment, the processor is configured to estimate the number of UEs attempting to access the base station for the first time period by determining a barring factor for the first time period, and determining a number of UEs accessing the base station for the first time period.

According to another aspect of this embodiment, the processor is configured to estimate the number of UEs attempting to access the base station by $N_i=A_i/(1-f_i)$, whereby $N_i$ is the estimated number of UEs attempting to access the base station in the first time period. $A_i$ is the number of UEs accessing the base station in the first time period, and $f_i$ is the barring factor for the first time period.

According to yet another aspect of this embodiment, the processor is configured to determine the barring factor for the second time period by monitoring a resource utilization of the base station for the first time period. Available resources of the base station are estimated for the first time period and a number of UEs to permit access to the base station for the second time period is determined based on the number of UEs accessing the base station in the first time period, the resources utilization of the base station for the first time period and the available resources for the second time period.

According to still another aspect of this embodiment, the processor is configured to determine the number of UEs to permit access to the base station for the second time period by $A_{i+1}=RA_{i+1}/RUe_{i+1}$, whereby $A_{i+1}$ is the number of UEs to allow access to the base station for the second time period, i+1. $RA_{i+1}$ is the estimated available resources of the base station for the second time period, and $RUe_{i+1}$ is a measure of average resources required for a UE for the second time period.

According to an aspect of this embodiment, the processor is configured to determine the barring factor for the second time period by $f_{i+1}=1-(A_{i+1}/(N_i-A_i))$, whereby $f_{i+1}$ is the barring factor for the second time period, i+1. $A_{i+1}$ is the number of UEs to allow access to the base station for the second time period, i+1. $N_i$ is the number of UEs attempting to access the base station in the first time period. $A_i$ is the number of UEs successfully attempting to access the base station in the first time period, and $(N_i-A_i)$ is the number of UEs unsuccessfully attempting to access the base station in the first time.

According to another aspect of this embodiment, the processor is further configured to determine a barring time based at least in part on the determined barring factor for the second time period.

According to yet another aspect of this embodiment, the barring time is determined by $BT_{i+1}=BT_{min}+((BT_{max}-BT_{min})*f_{i+1})$, whereby $BT_{i+1}$ is the barring time for the second time period, i+1. $BT_{min}$ is the minimum barring time to allow and is configurable with a minimum value of zero. $BT_{max}$ is the maximum barring time to allow and is configurable with a value equal to or greater than $BT_{min}$, and $f_{i+1}$ is the barring factor for the second time period, i+1.

According to still another aspect of this embodiment, the base station supports multiple services, and the processor is further configured to determine barring factors for the second time period for each of the multiple services based at least in part on the estimated number of UEs attempting to access the base station.

According to an aspect of this embodiment, the processor is further configured to determine barring times for the second time period for each of the multiple services based at least in part on a corresponding determined barring factor for the second time period.

According to another aspect of this embodiment, the base station supports multiple traffic types, and the processor is further configured to determine barring factors for the second time period for each of the multiple traffic types.

According to yet another aspect of this embodiment, the processor is further configured to determine barring times for the second time period for each of the multiple traffic types based at least in part on a corresponding determined barring factor for the second time period.

According to another embodiment, a node for communicating with multiple User Equipments, UEs, in a communication network is provided. The node includes an estimating module for estimating a number of UEs attempting to access the base station for a first time period. A determining module is provided for determining a barring factor for a second time period based at least in part on the estimated number of UEs attempting to access the base station, the second time period being different than the first time period.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

In order to optimally utilize network resources in a telecommunications network, it may be advantageous to set access barring parameters based on a number of user equipment attempting to access the network in a particular time period and/or an amount of resources available in the network for a particular time period. By normalizing a manner in which the access barring parameters are established, network administrators and/or base station administrators may dynamically adjust the access control parameters to reflect both the resources available in a cell and a number of user equipment attempting to access the cell. Adjusting the access control parameters will allow improved management of access barring in the network as compared with existing methods and, thereby, reduce unnecessary barring and/or congestion in the network.

As used herein, relational terms, such as "first" and "second," "top" and "bottom," and the like, may be used solely to distinguish one entity or element from another entity or element without necessarily requiring or implying any physical or logical relationship or order between such entities or elements.

In embodiments described herein, the joining term, "in communication with" and "connected to," and the like, may be used to indicate electrical or data communication, which may be accomplished by physical contact, induction, electromagnetic radiation, radio signaling, infrared signaling or optical signaling, for example. The above methods of achieving electrical or data communication are non-limiting and mentioned only for illustration. One having ordinary skill in the art will appreciate that multiple components may interoperate and modifications and variations are possible of achieving the electrical and data communication.

Figure 1:
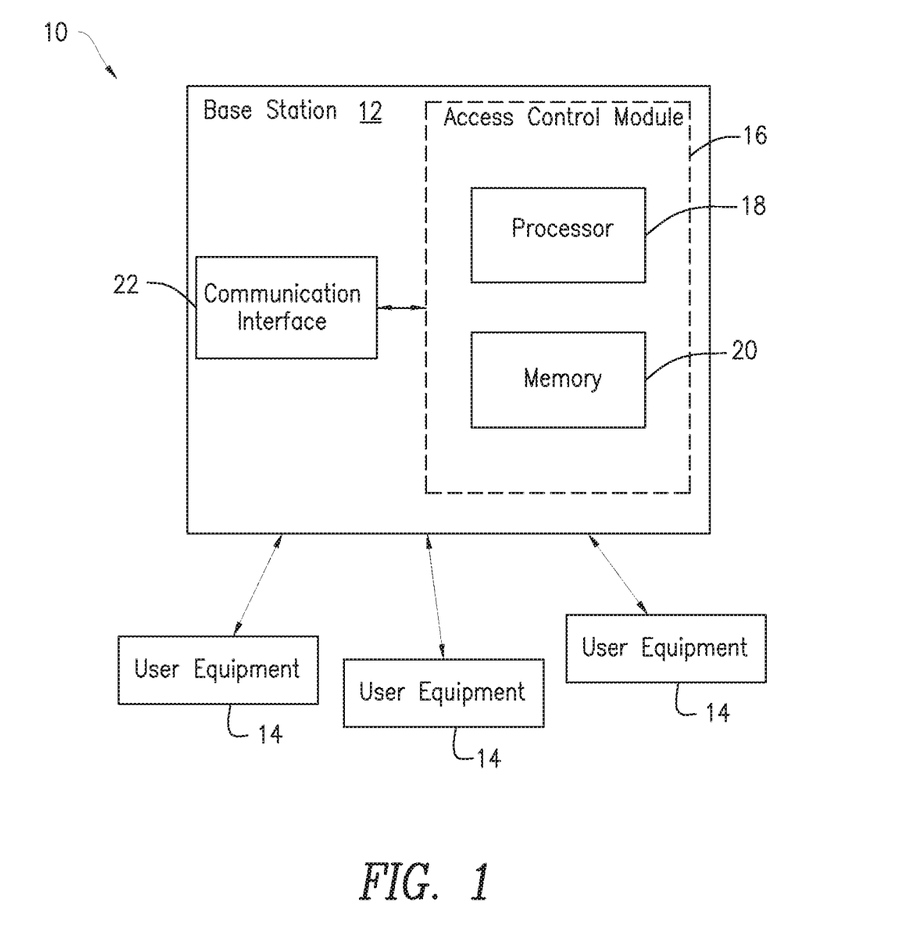
FIG. 1 is a block diagram of a communication system constructed in accordance with principles of the present invention.

Referring to the drawing figures in which like reference designators refer to like elements, FIG. 1 shows a block diagram of a communication system 10 according to an exemplary embodiment of the present invention. In one exemplary embodiment, communication system 10 is a Long Term Evolution (LTE) network, however, the invention is not limited to such. It is contemplated that other networking technologies, such as other network types compliant with 3rd Generation Partnership Project (3GPP) specifications can be implemented as communication system 10. The communication system 10 includes a base station 12 in communication with one or more user equipments (UEs) 14. UE 14 includes any wireless device that can communicate with the base station 12. The base station 12 may be part of a Radio Access Network (RAN) (not pictured) that is in communication with a Core Network (CN) (not pictured) and may be, for example, an Evolved Note B (eNodeB), which is part of an LTE network. The base station 12 provides the air interface for the UE 14 and communicatively couples the UE to a CN, for example. The base station 12 includes an access control module 16 for managing access control parameters of the wireless communication link between the base station 12 and the UE 14.

The access control module 16 may be implemented, for example, in hardware in a processor 18 or as a combination of hardware and software. Programmatic code to implement aspects of the access control module 16, including the instructions and functions executed on the processor 18 may be stored in a memory 20. The memory 20 may be any volatile or non-volatile storage device capable of storing data including, for example, solid-state memory, optical storage, and magnetic storage. The access control module 16 may utilize a communication interface 22 to determine characteristics of the network such as a number of UEs 14 connected to the base station 12, which may mean to include a number of UEs 14 successfully connecting to the base station 12 during a given time period.

A block diagram of an exemplary process of defining access barring parameters for the network 10 is described with reference to FIG. 2. The access control module 16 determines a number of UEs 14 attempting to access the base station 12 in a first time period (block S100). The "time period" referenced herein is a predetermined length of time or interval that is used as a period of measurement in making the above determination. According to some exemplary embodiments, the access barring time is used as the time period. The time period may be a single value that is configured to be used for all services for the base station 12. Accordingly, the time period may also be a single value configured for all services in all cells in a network. According to some embodiments, the time period may be different based on a cell's size and/or relative position in a network. For example, a cell having a relatively small size, i.e., relatively small geographic area, may have a shorter time period as compared to a cell having a relatively large size, i.e., relatively large geographic area. Likewise, a cell located at an edge of a network may have a shorter time period as compared to a cell located toward a center of the network.

The access control module 16 determines a barring factor for a second time period based at least in part on the determined number of UEs 14 attempting to access the base station 12 in the first time period (block S102). The access control module 16 may determine a barring time for the second time period based at least in part on the determined number of UEs 14 attempting to access the base station 12 in the first time period (block S104). According to some exemplary embodiments, the barring time for the second time period may be determined based in part on the barring factor for the second time period. It will be appreciated that because the barring factor for the second time period is based at least in part on the determined number of UEs 14 attempting to access the base station 12 in the first time period, the barring time is also based on the determined number of UEs 14 attempting to access the base station 12 in the first time period. The access control module 16 may determine the barring time relative to a predetermined minimum barring time and a predetermined maximum barring time. Thus, the access control module 16 determines the barring time by the equation:

$$BT_{i+1} = BT_{min} + ((BT_{max} - BT_{min}) * f_{i+1}). \qquad \text{(Eq. 1)}$$

In Eq. 1 above, $BT_{i+1}$ is the barring time for the second time period, i+1. $BT_{min}$ is the minimum barring time to allow and is configurable with a minimum value of zero. $BT_{max}$ is the maximum barring time to allow and is configurable with a value equal to or greater than $BT_{min}$. $f_{i+1}$ is the barring factor for the second time period, i+1.

Of note, the barring factor "f" described herein refers to a blocking factor and is ostensibly the opposite of the 3GPP ac-BarringFactor as described in 3GPP TS 36.331 V12.1.0 (2014 March). In other words, 3GPP TS 36.331 V12.1.0 (2014 March) ac-BarringFactor$_{i+1}$=1−$f_{i+1}$.

The access control module 16 may associate the determined barring factor to at least one service or traffic type of the base station 12 (block S105). In this way, the determined barring factor may be specifically determined for one service or a group of services. The determined barring factor may also be specifically determined for one traffic type or a group of traffic types. It will be appreciated that when the barring factor is associated to one service or a group of services, the number of UEs 14 determined above (block S100) may be limited to the UEs 14 attempting to access the corresponding one service or the group of services. Accordingly, because the barring time is determined based on the barring factor, the determined barring time may also be associated to or determined for the one service or the group of services.

It will be further appreciated that when the barring factor is associated to one traffic type or a group of traffic types, the number of UEs 14 determined above (block S100) may be limited to the UEs 14 attempting to communicate the corresponding one traffic type or group of traffic types. Accordingly, because the barring time is determined based on the barring factor, the determined barring time may also be associated to or determined for the one traffic type or group of traffic types.

Figure 3:
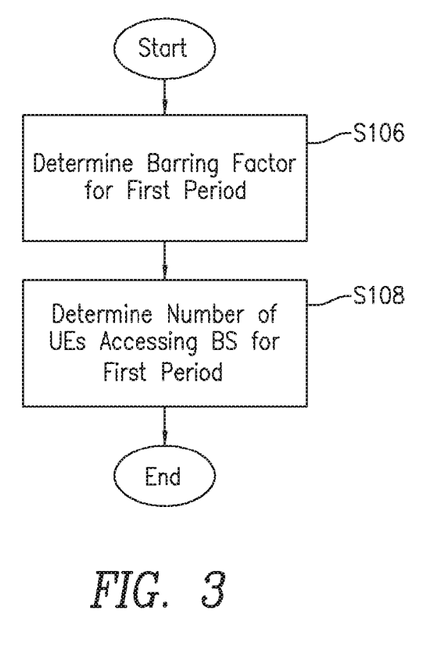
FIG. 3 is a flow chart of an exemplary process for determining a number of User Equipments, UEs, accessing a base station in a first time period.

FIG. 3 shows an exemplary block diagram of a process of determining a number of UEs 14 attempting to access the base station 12 in the first time period (block S100). The access control module 16 initially determines a barring factor that was established for the first time period (block S106). According to some exemplary embodiments, the barring factor for the first time period may be retrieved from memory 20. The access control module 16 determines a number of UEs 14 that attempted to access the base station 12 in the first time period based on the determined barring factor for the first time period and the number of UEs 14 that successfully accessed the base station 12 in the first time period (block S108). The number of UEs 14 that attempted to access the base station 12 is estimated by the equation:

$$N_i = A_i/(1-f_i). \quad \text{(Eq. 2)}$$

In Eq. 2 above, $N_i$ is the estimated number of UEs attempting to access the base station in the first time period, i, where i is greater than or equal to zero. $A_i$ is the number of UEs accessing the base station in the first time period. $f_i$ is the barring factor for the first time period. Of note the process described herein is recursive, where $f_0$ is the initial barring factor at the start. As the initial condition $f_0$=0 or some other pre-configured value in the range [0.00, 1.00). As such, $f_1$ is based on the use of $f_0$, $f_2$ uses $f_1$, etc.

Figure 4:
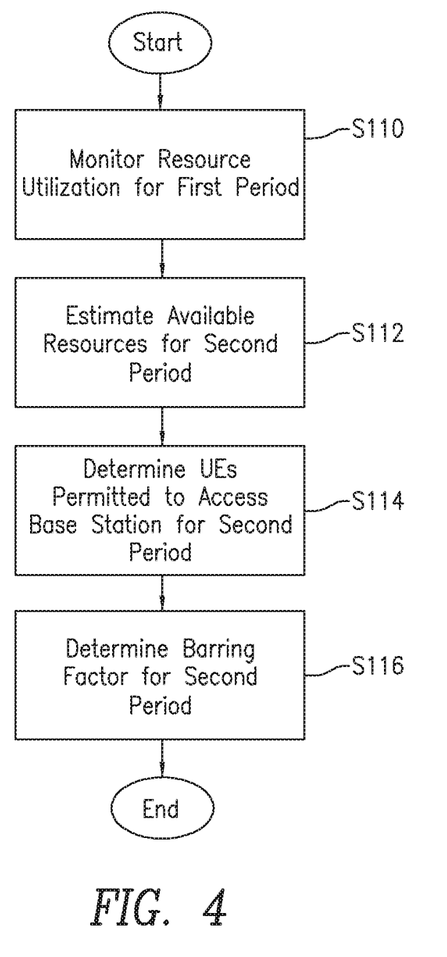
FIG. 4 is a flow chart of an exemplary process for determining a barring factor for a second time period.

FIG. 4 shows a block diagram of an exemplary process of determining the barring factor for the second time period (block S102). The access control module 16 monitors a network resource utilization of the base station 12 for the first time period (block S110). According to exemplary embodiments, resource utilization may include a measure of consumed bandwidth, processor time, and memory usage, for example. The resource utilization may be monitored based on a type of access by the UE 14, which may include an indication of a priority of the access, a data type or a type of UE 14, for example. By way non-limiting example, a user dialing an emergency number (e.g., 911, 999) may be determined to be an emergency-type access and, consequently have a higher priority. The nature of the data being transmitted may also affect the access types for the media being transmitted may affect a priority of the data. For example, voice data may have a higher priority than video data. In one embodiment, access types include voice data and signaling access types, and video data and signaling access types. For example with respect to 3GPP, the access types include ac-BarringForMO-Signalling, ac-BarringForMO-Data, ssac-BarringForMMTEL-Voice-r9, ssac-BarringForMMTEL-Video-r9, and ac-BarringForCSFB-r10. The resource utilization may also be monitored based on a traffic type, which may include an indication of a type of media or data being transmitted to and/or received from the UE 14.

The access control module 16 estimates the available resources for the second time period (block S112). The available resources available may be determined by the access control module 16 by monitoring historic resource utilization levels of the base station 12 for the predetermined periods of time. The access control module 16 determines the required resources for the second period of time for a single UE 14 by monitoring the resource utilization of the UEs 14 in the first time period and dividing by the determined number of UEs 14 that successfully accessed the base station 12 in the first time period to arrive at an estimate of the required resources for a single UE 14.

The access control module 16 determines the number of UEs 14 that are permitted to access the base station 12 for the second time period (block S114). The access control module 16 may determine the permitted number of UEs 14 by the equation:

$$A_{i+1} = RA_{i+1}/RUe_{i+1}. \quad \text{(Eq. 3)}$$

In Eq. 3 above, $A_{i+1}$ is the number of UEs allowed to access to the base station for the second time period, i+1. $RA_{i+1}$ is the estimated available resources of the base station for the second time period. $RUe_{i+1}$ is a measure of average resources required for a UE for the second time period. As noted above i is greater than or equal to zero, and $f_0$ is the initial barring factor at the start. As the initial condition $f_0$=0 or some other pre-configured value in the range [0.00, 1.00).

The access control module 16 determines the barring factor for the second time period (block S116) by the equation:

$$f_{i+1} = 1 - (A_{i+1}/(N_i - A_i)). \quad \text{(Eq. 4)}$$

In Eq. 4 above, $f_{i+1}$ is the barring factor for the second time period, i+1. $A_{i+1}$ is the number of UEs to allow access to the base station for the second time period. $N_i$ is the number of UEs attempting to access the base station in the first time period, i. $A_i$ is the number of UEs successfully attempting to access the base station in the first time period. It will thus be appreciated that ($N_i - A_i$) is the number of UEs unsuccessfully attempting to access the base station in the first time period. In other words, the recursive nature of the process uses data from the prior period to determine the barring factor for the current period.

Although not shown in the drawing figures, it is noted that, for application of the barring factor $f_{i+1}$ to 3GPP networks, the 3GPP ac-BarringFactor should be mapped to the barring factor $f_{i+1}$ described herein. As noted above, the current 3GPP (as set forth, for example, in 3GPP TS 36.331 V12.1.0 (2014 March)) ac-BarringFactor=1−$f_{i+1}$. For 3GPP networks, the mapping can be performed just before the barring parameters (for each access type) for the particular cell are broadcast by base station 12.

Figure 2:
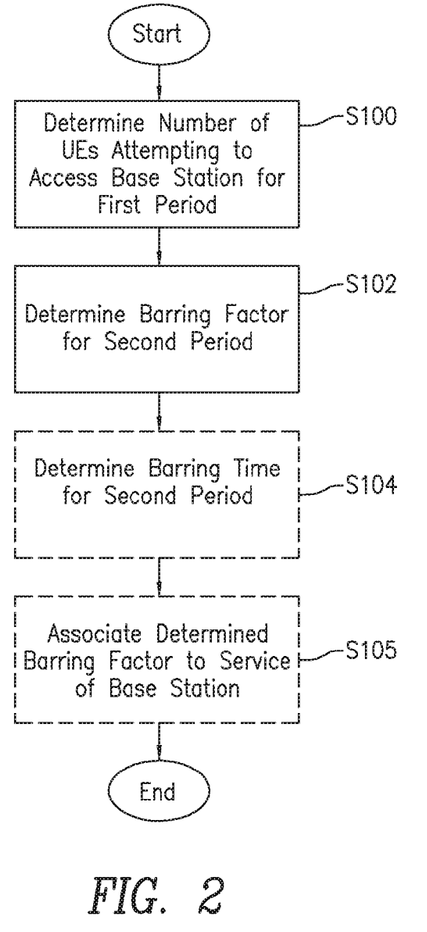
FIG. 2 is a flow chart of an exemplary process for defining access barring parameters in a communication network in accordance with principles of the present invention.

Also of note, although Eqs. 3 and 4 and the corresponding processes in FIGS. 2-4 are described without reference to a specific access type, in one embodiment, the access control parameter calculations, i.e., barring factor and barring time, are determined for each access type. In other words, the processes in FIGS. 2-4 are performed within a time interval for each access type so that there is a set of access control parameters for each access type each time interval. Accordingly, N, RA and RU are measured/determined for each access type.

For base station 12 performance and tuning simplicity, it may be desirable to establish a minimum barring factor and a maximum barring factor for the base station 12 between which the barring factor must remain. Thus, in the event the determined barring factor for the second time period falls outside predetermined limits, for example, if the determined barring factor $f_{i+1}$ from Eq. 4 above is less than the predetermined minimum barring factor, $f_{min}$:

$$f_{i+1}=f_{min}. \quad \text{(Eq. 5)}$$

Likewise, if the determined barring factor $f_{i+1}$ from Eq. 4 above is greater than the predetermined maximum barring factor, $f_{max}$:

$$f_{i+1}=f_{max}. \quad \text{(Eq. 6)}$$

It will be appreciated that the minimum barring factor $f_{min}$ may be a value between zero and 1.00 and the maximum barring factor $f_{max}$ may be a value between the minimum barring factor, $f_{min}$, and 1.00.

Figure 5:
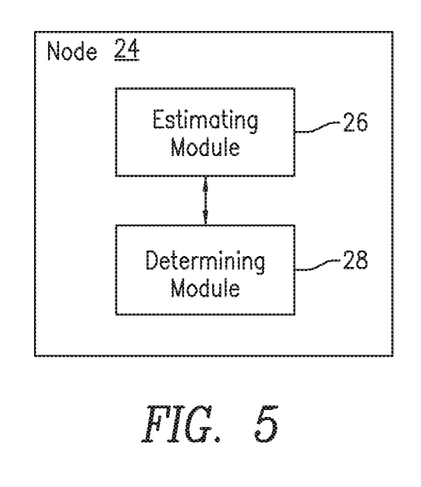
FIG. 5 is a block diagram of a node constructed in accordance with principles of the present invention.

FIG. 5 shows a block diagram of an exemplary node constructed in accordance with an exemplary embodiment of the present invention. The node 24 may be implemented in the base station 12 or as the base station 12, and communicate with the UEs 14. According to some exemplary embodiments, the node 24 communicates with the base station 12 and with the UEs 14, and manages the access barring parameters for the network 10. The node 24 includes an estimating module 26 and a determining module 28 that are implemented in hardware, i.e., a processor, software stored in memory, i.e., volatile or non-volatile, or a combination thereof. The estimating module 26 and the determining module 28 are configured to implement functional aspects of the access control module 16. The estimating module 26 implements aspects including, but not limited to, estimating a number of UEs 14 attempting to access the base station 12 for a first time period. The determining module 28 implements aspects including, but not limited to, determining a barring factor for a second time period based at least in part on the estimated number of UEs 14 attempting to access the base station 12, whereby the second time period is different than the first time period.

In the above invention, access barring parameters are based on the number of UEs 14 allowed access to the base station 12. In addition, the barring parameters also reflect the actual resources available in the cell and the number of UEs 14 allowed to access the cell utilize historical usage to allow precise utilization of the cell's resources. Thus the access barring parameters are normalized to the available resources and the number of UEs 14 attempting to access the resources.

Consequently, normalizing the access barring parameters will 1) reduce collision during procedures on the Random Access Channel (RACH) by controlling the number of UEs allowed on the channel, 2) reduce signaling overload for the base station, and 3) reduce the number of rejections and service pre-emption during admission control.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A method of access barring using access barring parameters in a communication network, the communication network including a base station in communication with a plurality of User Equipments (UEs), the method comprising:
   estimating a number of UEs attempting to access the base station for a first time period;
   determining a barring factor for a second time period based at least in part on the estimated number of UEs attempting to access the base station, the second time period being different than the first time period, wherein determining the barring factor for the second time period comprises:
      monitoring a resource utilization of the base station for the first time period, wherein the resource utilization is monitored based on a type of access by a UE of the plurality of UEs, and wherein the type of the access includes an indication of a priority of the access;
      estimating available resources of the base station for the second time period; and
      determining a number of UEs to permit access to the base station for the second time period based on: a number of UEs accessing the base station in the first time period, the resource utilization of the base station for the first time period, and the estimated available resources for the second time period, and wherein the barring factor for the second time period is determined by $f_{i+1}=1-(A_{i+1}/(N_i-A_i))$, wherein:
      $f_{i+1}$ is the barring factor for the second time period, i+1;
      $A_{i+1}$ is the number of UEs to permit access to the base station for the second time period, i+1;
      $N_i$ is the number of UEs attempting to access the base station for the first time period;
      $A_i$ is a number of UEs successfully attempting to access the base station for the first time period; and
      $(N_i-A_i)$ is a number of UEs unsuccessfully attempting to access the base station for the first time period; and
   barring access of one or more UEs of the number of UEs attempting to access the base station, based on the determined barring factor.

2. The method according to claim 1, wherein estimating the number of UEs attempting to access the base station for the first time period comprises:
   determining a barring factor for the first time period; and
   determining the number of UEs accessing the base station for the first time period.

3. The method according to claim 2, wherein estimating the number of UEs attempting to access the base station for the first time period is determined by:

$$N_i=A_i/(1-f_i),$$

wherein $f_i$ is the barring factor for the first time period.

4. The method according to claim 1, wherein the number of UEs to permit access to the base station for the second time period is determined by:

$$A_{i+1}=RA_{i+1}/RUe_{i+1}, \text{ wherein:}$$

$RA_{i+1}$ is the estimated available resources of the base station for the second time period; and RUe$_{i+1}$ is a measure of average resources required for a UE for the second time period.

5. The method according to claim 1, further comprising: determining a barring time based at least in part on the determined barring factor for the second time period.

6. The method according to claim 5, wherein the barring time is determined by:

$$BT_{i+1}=BT_{min}+((BT_{max}-BT_{min})*f_{i+1}), \text{ wherein:}$$

BT$_{i+1}$ is the barring time for the second time period, i+1;
BT$_{min}$ is the minimum barring time to allow and is configurable with a minimum value of zero;
BT$_{max}$ is the maximum barring time to allow and is configurable with a value equal to or greater than BT$_{min}$; and
f$_{i+1}$ is the barring factor for the second time period, i+1.

7. The method according to claim 1, wherein:
the base station supports a plurality of services, the method further comprising:
determining barring factors for the second time period for each of the plurality of services based at least in part on the estimated number of UEs attempting to access the base station.

8. The method according to claim 7, further comprising: determining barring times for the second time period for each of the plurality of services based at least in part on a corresponding determined barring factor for the second time period.

9. The method according to claim 1, wherein:
the base station supports a plurality of traffic types, the method further comprising:
determining barring factors for the second time period for each of the plurality of traffic types.

10. The method according to claim 9, further comprising: determining barring times for the second time period for each of the plurality of traffic types based at least in part on a corresponding determined barring factor for the second time period.

11. A base station in communication with a plurality of User Equipments (UEs) in a communication network, the base station comprising:
a processor configured to:
estimate a number of UEs attempting to access the base station for a first time period;
determine a barring factor for a second time period based at least in part on the estimated number of UEs attempting to access the base station, the second time period being different than the first time period, wherein the processor is configured to determine the barring factor for the second time period by:
monitoring a resource utilization of the base station for the first time period, wherein the resource utilization is monitored based on a type of access by a UE of the plurality of UEs, and wherein the type of the access includes an indication of a priority of the access;
estimating available resources of the base station for the second time period; and
determining a number of UEs to permit access to the base station for the second time period based on: a number of UEs accessing the base station in the first time period, the resource utilization of the base station for the first time period, and the estimated available resources for the second time period; and wherein the processor is configured to determine the barring factor for the second time period by: f$_{i+1}$=1−(A$_{i+1}$/(N$_i$−A$_i$)), wherein:

f$_{i+1}$ is the barring factor for the second time period, i+1;
A$_{i+1}$ is the number of UEs to permit access to the base station for the second time period, i+1;
N$_i$ is the number of UEs attempting to access the base station for the first time period;
A$_i$ is a number of UEs successfully attempting to access the base station for the first time period; and
(N$_i$−A$_i$) is a number of UEs unsuccessfully attempting to access the base station for the first time period; and
bar access of one or more UEs of the number of UEs attempting to access the base station, based on the determined barring factor.

12. The base station according to claim 11, wherein the processor is configured to estimate the number of UEs attempting to access the base station for the first time period by:
determining a barring factor for the first time period; and
determining the number of UEs accessing the base station for the first time period.

13. The base station according to claim 12, wherein the processor is configured to estimate the number of UEs attempting to access the base station for the first time period by:

$$N_i=A_i/(1-f_i),$$

wherein f$_i$ is the barring factor for the first time period.

14. The base station according to claim 11, wherein the processor is configured to determine the number of UEs to permit access to the base station for the second time period by:

$$A_{i+1}=RA_{i+1}/RUe_{i+1}, \text{ wherein:}$$

RA$_{i+1}$ is the estimated available resources of the base station for the second time period; and
RUe$_{i+1}$ is a measure of average resources required for a UE for the second time period.

15. The base station according to claim 11, wherein the processor is further configured to:
determine a barring time based at least in part on the determined barring factor for the second time period.

16. The base station according to claim 15, wherein the barring time is determined by:

$$BT_{i+1}=BT_{min}+((BT_{max}-BT_{min})*f_{i+1}), \text{ wherein:}$$

BT$_{i+1}$ is the barring time for the second time period i+1;
BT$_{min}$ is the minimum barring time to allow and is configurable with a minimum value of zero;
BT$_{max}$ is the maximum barring time to allow and is configurable with a value equal to or greater than BT$_{min}$; and
f$_{i+1}$ is the barring factor for the second time period, i+1.

17. The base station according to claim 11, wherein the base station supports a plurality of services, the processor being further configured to:
determine barring factors for the second time period for each of the plurality of services based at least in part on the estimated number of UEs attempting to access the base station.

18. The base station according to claim 17, wherein the processor is further configured to:
determine barring times for the second time period for each of the plurality of services based at least in part on a corresponding determined barring factor for the second time period.

19. The base station according to claim 11, wherein the base station supports a plurality of traffic types, the processor being further configured to:

determine barring factors for the second time period for each of the plurality of traffic types.

20. The base station according to claim 19, wherein the processor is further configured to:

determine barring times for the second time period for each of the plurality of traffic types based at least in part on a corresponding determined barring factor for the second time period.

21. A node for communicating with a plurality of User Equipments (UEs) in a communication network, the node comprising a processor, the processor being configured to:

estimate a number of UEs attempting to access a base station for a first time period;

determine a barring factor for a second time period based at least in part on the estimated number of UEs attempting to access the base station, the second time period being different than the first time period, wherein to determine the barring factor for the second time period, the processor is further configured to:

monitor a resource utilization of the base station for the first time period, wherein the resource utilization is monitored based on a type of access by a UE of the plurality of UEs, and wherein the type of the access includes an indication of a priority of the access;

estimate available resources of the base station for the second time period; and determine a number of UEs to permit access to the base station for the second time period based on: a number of UEs accessing the base station in the first time period, the resource utilization of the base station for the first time period, and the estimated available resources for the second time period; and wherein the processor is further configured to determine the barring factor for the second time period by:

$f_{i+1} = 1 - (A_{i+1}/(N_i - A_i))$, wherein:

$f_{i+1}$ is the barring factor for the second time period, i+1;

$A_{i+1}$ is the number of UEs to permit access to the base station for the second time period, i+1;

$N_i$ is the number of UEs attempting to access the base station for the first time period;

$A_i$ is a number of UEs successfully attempting to access the base station for the first time period; and $(N_i - A_i)$ is a number of UEs unsuccessfully attempting to access the base station for the first time period; and bar access of one or more UEs of the number of UEs attempting to access the base station, based on the determined barring factor.

* * * * *